L. H. PIEPER.
CHEESE FOLLOWER.
APPLICATION FILED OCT. 26, 1914.
1,158,276.
Patented Oct. 26, 1915.
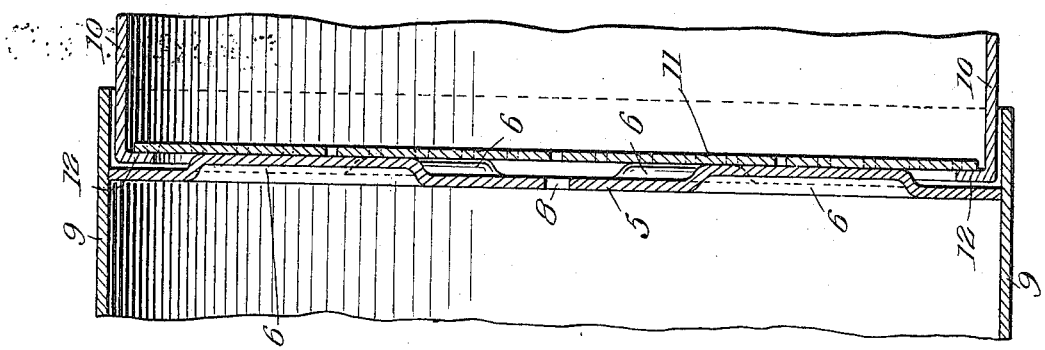
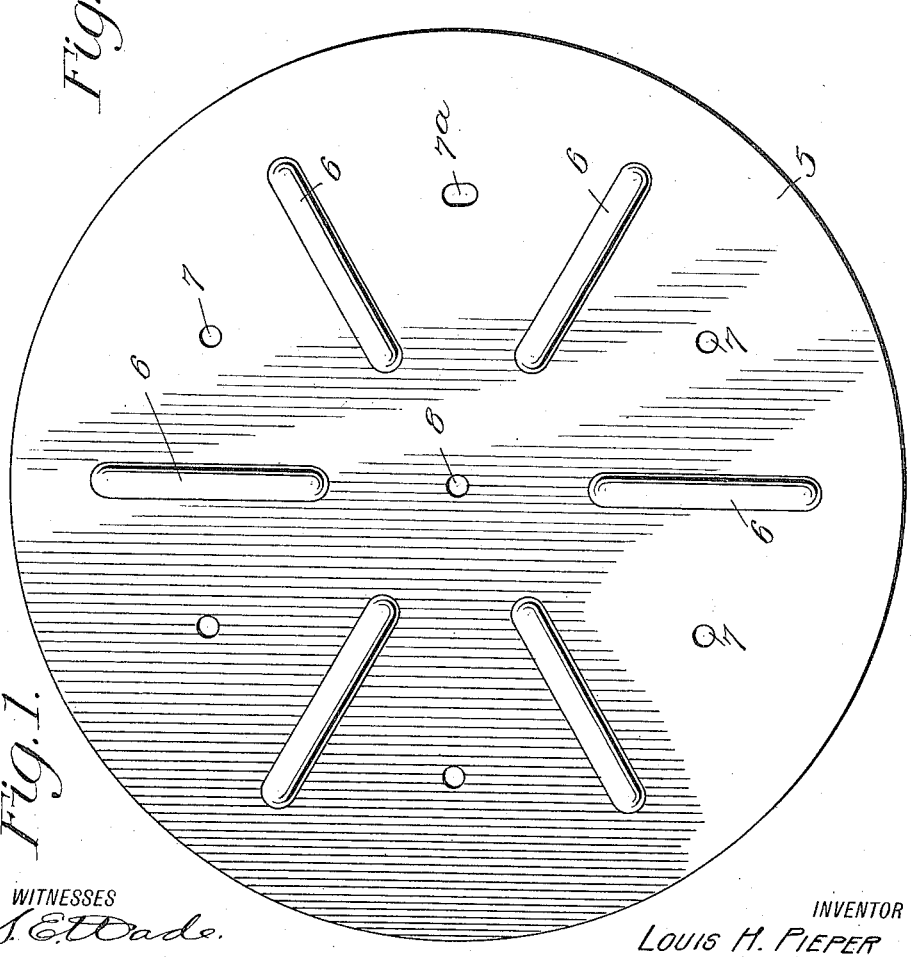
WITNESSES
S. E. Dade.
H. E. Beck.
INVENTOR
LOUIS H. PIEPER
BY Munn & Co.
ATTORNEYS

UNITED STATES PATENT OFFICE.

LOUIS H. PIEPER, OF PLYMOUTH, WISCONSIN.

CHEESE-FOLLOWER.

1,158,276.

Specification of Letters Patent.

Patented Oct. 26, 1915.

Application filed October 26, 1914. Serial No. 868,636.

*To all whom it may concern:*

Be it known that I, LOUIS H. PIEPER, a citizen of the United States, residing at Plymouth, in the county of Sheboygan and State of Wisconsin, have invented certain new and useful Improvements in Cheese-Followers, of which the following is a specification.

This invention relates to cheese followers, and one of the principal objects thereof is to provide an improved and simplified follower constructed of a single sheet or piece of metal, and one which will be extremely sanitary, and efficient in operation.

Another object of the invention is to provide a follower formed of a disk of metal provided with radially pressed ridges alternating with openings or perforations, whereby practically the entire area of the disk or follower may be utilized for the proper drainage of whey, instead of the narrow grooves or channels utilized in the old style wooden followers.

Still another object of the invention is to provide a metallic one piece follower which is very thin, so that a greater amount of cheese may be pressed in any given press than could be pressed by the use of the old followers.

With these and other objects in view which will become apparent as the description proceeds, the invention resides in the construction, combination and arrangement of parts, hereinafter more fully described and claimed, and illustrated in the accompanying drawing, in which like characters of reference indicate like parts throughout the several figures, of which—

Figure 1 represents a top plan view of a follower constructed according to my invention, and Fig. 2 represents a fragmentary sectional view taken axially through a cheese hoop, showing the follower positioned therein.

Referring more particularly to the drawing, the follower comprises a flat disk 5 formed of suitable metal, and provided with a plurality of radially extending equally spaced ridges 6. The ridges are stamped from the metal, and terminate at their ends a short distance from the periphery and the center respectively of the disk. The ridges 6 alternate with perforations or openings 7 provided for the passage of whey. An opening 8 is also provided at the center of the disk for the same purpose. One of the openings 7 as indicated at 7ª is lengthened or made oblong whereby the disk may be engaged by a hook or similar implement for removing the follower from the cheese hoop when the cheese has been pressed. The particular number and arrangement of the ridges and openings, may be varied with the various sizes and shapes of followers in order to produce the best result in each particular case.

In Fig. 2, 9 indicates the outer portion and 10 the inner portion of a pair of "gang press" hoops of a well known type. As is usual in the structure of these hoops, the outside diameter of the inner portion 10 is somewhat less than the inside diameter of the outer portion 9, so that an annular space is left between the hoops through which the whey may find its exit. The follower 5 is disposed in the outer portion 9 of one hoop, in the manner indicated, with the ridges or ribs 6 extending outwardly. These ribs form a seat for the perforated bottom 11 in the opposite hoop. Said bottom rests at its periphery against the inwardly extending flange 12 of the outer hoop. It will be noted that the depth of the ribs 6 is somewhat greater than the thickness of the flange 12 so that a space is left between said flange and the disk or follower 5 to allow passage of whey between these parts. As the cheese is being pressed the whey percolates through the openings 7 and 8 and runs out between the disk and flange 12 and between the adjacent portions 10 and 9 of the hoops. It will be noted that almost the entire surface of the disk may be utilized in draining the whey. This is a distinct advantage over the old style followers in which grooves or channels are provided for this drainage, because the grooves or channels often times become congested with whey and grease which block the passages or channels and prevent a thorough drainage of the whey. The grooves are also very hard to keep in a clean and sanitary condition. The rib 6 while spacing the disk from the bottom 11, forms a good substantial rest for the bottom and will not injure the latter in any way.

Such a follower as I have provided is of an extremely sanitary nature, for the reason that it may be very readily cleaned and because of the thinness of the metal no whey or grease will remain in the drainage openings. This follower will last an extremely long time since it is preferably made of some suitable metal, and is not subject to breakage such as are the old style wooden followers.

Although I have described the preferred embodiment of my invention, I may desire to make such changes in the construction, combination and arrangement of parts thereof as do not depart from the spirit of the invention and the scope of the appended claims.

I claim:—

1. A cheese follower comprising a single flat metal plate having a plurality of stamped ridges extending from one surface thereof, whereby the entire surface of the plate, exclusive of the ridges, may be utilized as a whey drainage, said plate having its flat portion only perforated.

2. A cheese follower comprising a single flat metal plate provided with a plurality of imperforate ribs and provided with a plurality of perforations arranged between the ribs.

3. In a cheese press, the combination with a hoop having an inwardly projecting flange, and a bottom adapted to rest against said flange, of a follower comprising a disk having projections pressed from one face thereof, said projections being of a depth greater than the thickness of said flange.

LOUIS H. PIEPER.

Witnesses:
R. C. KOEHLER,
LEON E. GRIESE.

Copies of this patent may be obtained for five cents each, by addressing the "Commissioner of Patents, Washington, D. C."